W. A. FINLEY.
REBOUND CHECK.
APPLICATION FILED DEC. 14, 1911.
1,040,917.
Patented Oct. 8, 1912.
2 SHEETS—SHEET 2.
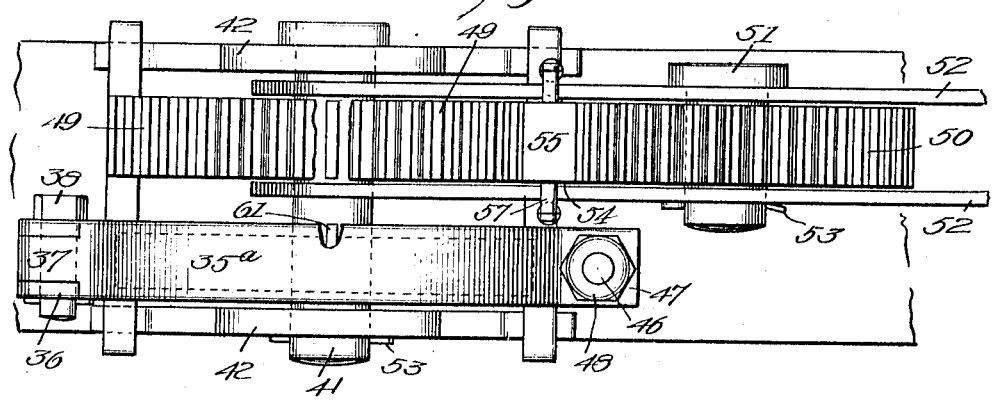
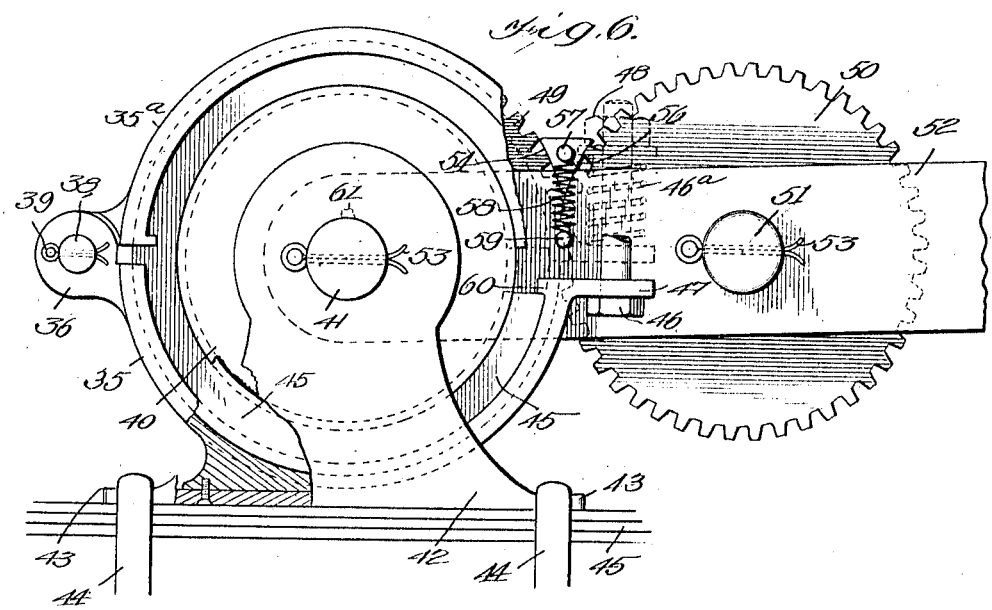
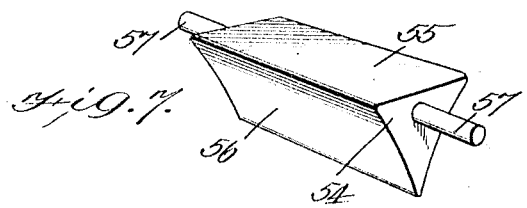
WITNESSES
INVENTOR
Walter A. Finley
BY
ATTORNEYS

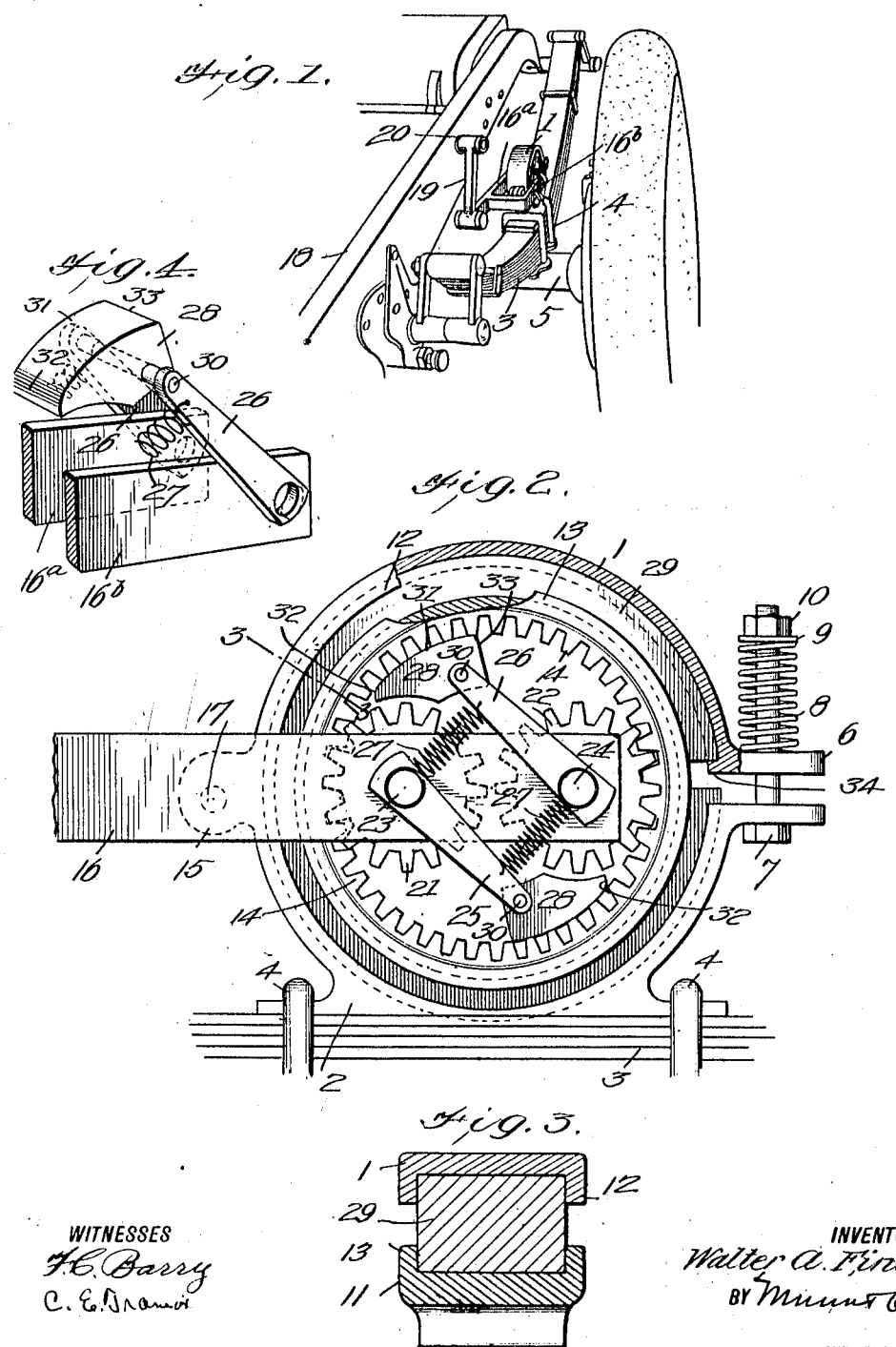

UNITED STATES PATENT OFFICE.

WALTER ARTHUR FINLEY, OF FAIRMONT, WEST VIRGINIA, ASSIGNOR OF ONE-FOURTH TO FREDERIC HELMICK, OF FAIRMONT, WEST VIRGINIA.

REBOUND-CHECK.

1,040,917.  Specification of Letters Patent.  Patented Oct. 8, 1912.

Application filed December 14, 1911. Serial No. 665,600.

*To all whom it may concern:*

Be it known that I, WALTER ARTHUR FINLEY, a citizen of the United States, and a resident of Fairmont, in the county of Marion, State of West Virginia, have invented a new and useful Improvement in Rebound-Check, of which the following is a specification.

In the drawings: Figure 1 is a perspective view of the improvement in place; Fig. 2 is a side view with parts broken away; Fig. 3 is a section on the line 3—3 of Fig. 2; Fig. 4 is a perspective view of a block and its mounting; Fig. 5 is a plan view of a modified form; Fig. 6 is a side view of Fig. 5 with parts thereof broken away; and, Fig. 7 is a perspective view of the block or shoe.

The embodiment of the invention shown in Figs. 1 to 4, comprises a split ring 1 having a base 2 which is secured to the spring 3 of the vehicle by means of the clips 4 that hold the spring to the axle 5. The clips engage over the ends of the base 2, and the ring may be connected to any vehicle by merely loosening the clips and slipping the ends of the base under the same. The ends of the ring are flanged outwardly to form radial lugs 6, and each lug is perforated to receive a bolt 7 for connecting the lugs. The bolt is encircled by a spring 8 above the uppermost lug, and a washer 9 is arranged on the bolt at the outer end of the spring. A nut 10 is threaded onto the end of the bolt for holding the parts in place, and by means of the nut the tension of the spring may be regulated. An inner ring 11 is provided, and the said ring is arranged within the ring 1. Each ring is provided at each side edge with a lateral flange, the flanges 12 of the ring 1 extending inwardly, while the flanges 13 of the inner ring extend outwardly. The ring 11 is provided with an internal series of gear teeth 14, and a lever 16 is arranged transversely of the rings at one end, the opposite end of the lever being connected to the frame 18 of the vehicle by means of a link 19. The link is pivoted at one end to the lever and at the other to a pin 20 on the frame. The lever 16 is forked adjacent to the ring 1, and the arms 16ᵃ and 16ᵇ of the fork extend on opposite sides of the rings. The arms are provided with registering openings and pins 23 and 24 are journaled in the respective openings; the said pins extend through the centers of the rings 1 and 11. A pinion is secured rigidly to each pin between the arms of the fork, and each pinion meshes with the teeth 14 of the ring 11. The pinion 21 on the pin 23 meshes with the teeth at one side of the ring, and the pinion 22 on the pin 24 meshes with the teeth at the opposite side. The pins are spaced apart a sufficient distance to prevent the pinions striking one another. A pair of arms 25 is secured to the pin 23 on the outer sides of the arms of the fork, and a similar pair of arms 26 is secured to pin 24 in the same manner. Each pair of arms is substantially parallel with the other pair of arms and extends in the opposite direction, and each pair of arms is connected to the pin of the other arm by coil spring 27. A block or shoe 28 is pivoted between the outer ends of each pair of arms on a pin 30, and the outer face of each block is curved on the arc of a circle whose center is the center of the rings 1 and 11. The pin 30 is nearer one end of the shoe than the other, and the end remote from the pin is pointed, as shown at 31. The corner of the said end adjacent to the teeth is rounded, as shown at 32 in Fig. 4. The rings 1 and 11 are held in spaced relation by means of a split ring 29 of fibrous material. The said ring is prevented from lateral movement by means of the flanges 12 and 13. The spring 8 permits some yielding of the parts.

In operation, when the frame 18 of the vehicle moves toward the axle, the outer end of the lever 16 is depressed, and the pinions 22 are rotated, on account of their engagement with the internal gear. The blocks or shoes 28 slip over the teeth of the ring, moving between the pinions. When, now, the frame of the vehicle moves upward, the blocks or shoes 28 become wedged between the pinions and the gear ring, thus locking the inner ring to the lever 16 and to the pinions, causing the said parts to move as a unit. The internal ring is rotated with respect to the outer ring, the movement being braked, however, by the ring 29. The tension of the brake may be varied by means of the nut 10 and the spring 8.

In the embodiment in Figs. 5 to 7, the split ring is composed of sections 35 and 35ᵃ, hinged together at one side, by means of spaced lugs 36 on the section 35, between which is received a lug 37 on the section 35ᵃ, and a pin 38 is passed through the lug, and is engaged by a cotter pin 39 to hold it in place. A disk 40 is arranged concentric with the ring, the said disk being secured to a shaft 41 journaled in standards 42 having feet 43 for engaging beneath the clips 44 of the spring 45 of the vehicle. A ring 45 of wood or like material, and corresponding to the ring 29 is arranged between the disk and the split ring, and the split ring is clamped on the disk and the ring 45, by means of the bolt 46 passing through radial lugs 47 at the opposite ends of the sections 35—35ª from the hinge. The bolt 46 is arranged in the same manner as the bolt 7, that is a spring 46ª encircles the bolt between the uppermost lug 47 and the nut 48 of the bolt. The split ring 35—35ª is secured to the standards 42, and the lower section thereof is rigidly connected with the spring in the same manner as the lower section of the ring in the construction shown in Figs. 1 to 4. A gear wheel 49 is secured to the shaft 41 between the standards 42, and the said gear wheel meshes with a gear wheel 50 on a pin or shaft 51 journaled transversely of the pair of arms 52, which are journaled on the shaft 41 at one end. The shafts 41 and 51 are held from longitudinal movement by means of cotter pins 53. A block or shoe 54 is arranged between the gear wheels 49 and 50 just above the point where they intermesh, and the said block or shoe (Fig. 7) is substantially triangular in cross section. It will be noticed, that the upper face 55 of the said block is plane, while the side faces 56 are concaved transversely, to fit the teeth of the gear wheels. That is the said faces are curved on an arc whose center is the center of the adjacent gear wheel. At each end the block or shoe is provided with a longitudinally extending pin 57, and a spring 58 connects each of the said pins 57 with a laterally extending pin 59 on the adjacent arm 52. The fibrous ring 45 is prevented from movement with the gear wheel 49, or rather with the disk 40, by means of a lug 60 on the section 35 of the split ring. The gear wheel 49 and the friction disk 40 are keyed to the shaft 41, by means of a key 61, and the gear wheel 50 is retained in mesh with the gear wheel 49, by the arms 52. The arms 52 correspond to the arms 16ª—16ᵇ of the lever 16 of the construction shown in Figs. 1 to 4, and the lever is connected to the frame of the vehicle in the same manner as the lever 16.

In operation, when the outer end of the lever of which the arms 52 are a part moves downwardly with the frame, the gear wheel 50 is moved downward, rotating freely, and being rotated by its engagement with the gear wheel 49. When, however, the outer end of the lever moves upwardly, the block or shoe 55 becomes wedged between the gear wheels, that is the said block or shoe locks the gear wheel 50 to the gear wheel 49, and constrains the said gear wheel 49 to rotate. The shaft 41 is rotated with the gear wheel, and the friction disk 40 is also rotated, being braked, however, by the pressure of the split ring 35—35ª. The tension of the brake may be adjusted, by means of the nut 48 and the spring 46ª.

The rings 29 and 45 have a high coefficient of friction, so that considerable friction is exerted, to brake or check the rotation of the ring in the one case or the disk in the other. The amount of friction exerted depends upon the tension of the springs 8—46ª. The ring 29 is held from rotation with respect to the outer ring, by means of an inwardly extending lug 34 engaging the end of the ring 29. In neither case is there any resistance offered to the downward movement of the vehicle frame, since this movement is cushioned by the springs of the vehicle. The resistance offered is to the upward movement of the frame. That is the upward movement of the vehicle frame with respect to the axle is cushioned.

I claim:

1. A rebound check adapted to be arranged between two members of a vehicle, and comprising a support for attachment to one of the members, a shaft rotatable on the support, a fibrous ring encircling the shaft, means for clamping the ring on the shaft, means for varying the tension of the clamping means, a lever journaled on the shaft at one end and adapted to be connected at the other with the other member of the vehicle, a gear wheel secured to the shaft, a gear wheel journaled on the lever and meshing with the gear wheel on the shaft, a wedge shape block above and between the gear wheels, a spring normally drawing the said block downward to lock the gear wheels together when the lever moves upward.

2. A rebound check adapted to be arranged between two members of a vehicle, and comprising a support for attachment to one of the members, a shaft rotatable on the support, a fibrous ring encircling the shaft, means for clamping the ring on the shaft, means for varying the tension of the clamping means, a lever journaled on the shaft at one end and adapted to be connected at the other with the other member of the vehicle, a gear wheel secured to the shaft, a gear wheel journaled on the lever and meshing with the gear wheel on the shaft, and means for locking the gear wheels together when the free end of the lever moves upward.

3. A rebound check adapted to be arranged between two members of a vehicle, and comprising a support for attachment to one of the members, a shaft rotatable on the support, a fibrous ring encircling the shaft, means for clamping the ring on the shaft, means for varying the tension of the clamping means, a lever journaled on the shaft at one end and adapted to be connected at the other with the other member of the vehicle, a wheel on the shaft adjacent to the lever, and means for locking the lever to the wheel when the lever moves upward and for permitting the lever to move freely downward.

4. A rebound check adapted to be arranged between two members of a vehicle, and comprising a support for attachment to one of the members, a shaft rotatable on the support, a fibrous ring encircling the shaft, means for clamping the ring on the shaft, means for varying the tension of the clamping means, a lever journaled on the shaft at one end and adapted to be connected at the other with the other member of the vehicle, and means for locking the lever to the shaft when the lever moves upward and for releasing the lever from the shaft when the lever moves downward.

5. A rebound check adapted to be arranged between two members of a vehicle, and comprising a support for attachment to one member, a shaft journaled on the support, a lever journaled at one end on the shaft and adapted to be connected with the other member of the vehicle, means for locking the lever to the shaft when the said members move away from each other and for releasing the lever from the shaft when the members move together, and a braking device engaging the shaft, said device comprising a disk secured to the shaft, a split ring of fibrous material encircling the disk, a split ring encircling the fibrous ring, means for clamping the split ring on the fibrous ring, means for varying the tension of the clamping means, and means for preventing the rotation of the fibrous ring with respect to the split ring.

6. A rebound check adapted to be arranged between two members of a vehicle, and comprising a support for attachment to one member, a shaft journaled on the support, a lever journaled at one end on the shaft and adapted to be connected with the other member of the vehicle, means for locking the lever to the shaft when the said members move away from each other and for releasing the lever from the shaft when the members move together, and a braking device engaging the shaft, said device comprising a ring of fibrous material encircling the shaft, means for clamping the ring on the shaft, and means for varying the tension of the clamping means.

7. A rebound check adapted to be arranged between two members of a vehicle, and comprising a support for attachment to one member, a shaft journaled on the support, a lever journaled at one end on the shaft and adapted to be connected with the other member of the vehicle, means for locking the lever to the shaft when the said members move away from each other and for releasing the lever from the shaft when the members move together, and a braking device engaging the shaft.

8. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, a wedge arranged between the wheels on one side of the point of contact of the wheels with each other for locking the said wheels from rotation when the members move away from each other, a spring acting normally to press the wedge between the said wheels, a friction braking device engaging the first-named wheel for restraining the rotation thereof, and means for varying the pressure of the said means against the wheel.

9. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, a wedge arranged between the wheels on one side of the point of contact of the wheels with each other, for locking the said wheels from rotation when the members move away from each other, a spring acting normally to press the wedge between the said wheels, a braking device engaging the first-named wheel for restraining the rotation thereof, and means for varying the tension of the said device.

10. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, a wedge arranged between the wheels on one side of the point of contact of the wheels with each other, for locking the said wheels from rotation when the members move away from each other, a spring acting normally to press the wedge between the said wheels, and adjustable means engaging the first-named wheel for restraining the rotation thereof.

11. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, means on one side of the point of contact of the wheels for engaging between the said wheels to prevent rotation thereof when the members move away from each other, yielding means for pressing the said means into engagement with the wheels, and an adjustable braking device in connection with the first-named wheel for restraining the rotation thereof.

12. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, means for locking the wheels together when the members move away from each other, and means for restraining the rotation of the first-named wheel, said means being adjustable to vary the tension on the wheel.

13. A rebound check adapted to be arranged between two members movable with respect to each other for cushioning their movement away from each other, said check comprising a wheel journaled on one of the members, a second wheel mounted to oscillate in engagement with the first-named wheel and to be rotated thereby, said second wheel being connected to and moving with the other member, means on one side of the point of contact of the wheels for engaging between the wheels to prevent the said wheels from rotation when the members move away from each other, and a braking device for the first named wheel.

14. A rebound check adapted to be arranged between two members movable with respect to each other for cushioning their movement away from each other, said check comprising a rotatable element journaled on one of said members, a rotatable element journaled on the other member and mounted to oscillate in engagement with the first-named element and to be rotated by said element, means on one side of the point of contact of the elements for engaging between the elements to prevent the same from rotation when the members move away from each other, a braking device for the first-named element, and means for varying the tension of the said braking device.

15. A rebound check adapted to be arranged between two members movable with respect to each other, said check comprising two elements, one of which is rotatable and mounted to move in contact with the other, and to be rotated thereby, one of said elements being connected with one of the members, and the other with the other member and movable with the said members, means for engaging between the elements to prevent the rotation of the rotatable element when the members move away from each other, and a braking device in connection with the rotatable element.

16. A rebound check adapted to be arranged between two members movable with respect to each other, said check comprising two elements, one element being rotatable and mounted to move in contact with the other, and to be rotated thereby, one of said elements being connected with one of the members and the other with the other member and both moving with the said members to which they are connected, means for engaging between the elements to prevent the rotation of the rotatable elements when the members move away from each other, and a braking device for checking the rotation of the rotatable element.

17. A rebound check adapted to be arranged between two members movable with respect to each other, said check comprising two elements, one element being rotatable and mounted to move in contact with the other, and to be rotated thereby, one of said elements being connected with one of the members and the other with the other member and both moving with the said members to which they are connected, means for preventing the rotation of the rotatable element when the members move away from each other, and a braking device for checking the rotation of the rotatable element in either direction.

18. A rebound check adapted to be arranged between two members movable with respect to each other, said check comprising a plurality of elements moving in contact with each other, a braking device in connection with one of the elements, the other element moving in contact with the said element having the braking device and being rotated by the said element, one of the said elements being adapted for connection with one of the movable members and the other element being adapted for connection with the other movable member, and means for engaging between the elements when the movable elements move away from each other to prevent movement of the said elements with respect to each other.

WALTER ARTHUR FINLEY.

Witnesses:
 M. A. FLETCHER,
 WARD M. DOWNS.